(12) United States Patent
Monier et al.

(10) Patent No.: US 8,138,700 B2
(45) Date of Patent: Mar. 20, 2012

(54) SYNCHRONOUS RECTIFICATION DEVICE AND SYNCHRONOUS ELECTRIC MACHINE IMPLEMENTING THE DEVICE

(75) Inventors: Stephane Monier, Sannois (FR); Jean-Yves Le Gouil, Jouy-le-Moutier (FR)

(73) Assignee: Johnson Controls Automotive Electronics, Cergy Pontoise Cedex (FR)

( * ) Notice: Subject to any disclaimer, the term of this patent is extended or adjusted under 35 U.S.C. 154(b) by 339 days.

(21) Appl. No.: 12/070,728

(22) Filed: Feb. 19, 2008

(65) Prior Publication Data

US 2008/0197816 A1  Aug. 21, 2008

Related U.S. Application Data

(63) Continuation of application No. 10/573,523, filed as application No. PCT/FR2004/002407 on Sep. 24, 2004, now abandoned.

(30) Foreign Application Priority Data

Sep. 24, 2003  (FR) ...................... 03 11191

(51) Int. Cl.
*H02P 6/14* (2006.01)

(52) U.S. Cl. ............... 318/400.26; 388/907.2; 363/16
(58) Field of Classification Search ........... 318/400.26, 318/400.29, 700; 388/907.2; 363/16, 17
See application file for complete search history.

(56) References Cited

U.S. PATENT DOCUMENTS

| | | | | |
|---|---|---|---|---|
| 5,170,337 A | * | 12/1992 | Borowiec et al. | 363/147 |
| 5,666,035 A | * | 9/1997 | Basire et al. | 318/400.29 |
| 5,841,649 A | * | 11/1998 | Willett et al. | 363/98 |
| 5,889,376 A | * | 3/1999 | Takatsuka et al. | 318/434 |
| 6,058,031 A | * | 5/2000 | Lyons et al. | 363/67 |
| 6,295,199 B1 | * | 9/2001 | Le Gouil | 361/698 |
| 6,307,337 B1 | * | 10/2001 | Nelson | 318/400.29 |
| 6,356,043 B2 | * | 3/2002 | Baum | 318/400.26 |
| 6,687,142 B2 | * | 2/2004 | Scott | 363/97 |
| 6,697,271 B2 | * | 2/2004 | Corzine | 363/71 |

* cited by examiner

*Primary Examiner* — Rina I Duda
(74) *Attorney, Agent, or Firm* — Novak Druce + Quigg LLP

(57) ABSTRACT

The invention pertains to a synchronous rectification device (10) of the H-bridge type supplying a coil (5) of a phase of a synchronous machine, comprising four switches (21, 31, 22, 32) disposed on the electrical links (11, 12) of this H-bridge and intended to be instructed by an electronic circuit (40), characterized in that each switch comprises at least one transistor (T1) instructed by the electronic circuit (40).

10 Claims, 4 Drawing Sheets

SYNCHRONOUS RECTIFICATION DEVICE AND SYNCHRONOUS ELECTRIC MACHINE IMPLEMENTING THE DEVICE

CROSS-REFERENCE TO RELATED APPLICATIONS

This application is a continuation of U.S. patent application Ser. No. 10/573,523, filed Mar. 23, 2006 now abandoned. U.S. patent application Ser. No. 10/573,523, filed Mar. 23, 2006 is an application filed under 35 USC 371 based on PCT Application No. PCT/FR04/02407 filed Sep. 24, 2004. PCT Application No. PCT/FR04/02407 filed Sep. 24, 2004 claims priority to French Application No. 03 11191 filed Sep. 24, 2003.

FIELD OF THE INVENTION

The invention relates to a synchronous rectification device of the H-bridge type supplying a synchronous electric machine.

The invention also relates to a polyphase synchronous electric machine devised to work in motor mode and in generator mode, for example a motor vehicle alterno-starter.

BACKGROUND

A polyphase synchronous electric machine, for example a variable-reluctance motor, comprises (see FIG. 1) a rotor 1, a permanent magnet or equivalent, integral with a spindle 2 controlled in angular rotation, and a stator 3 having a plurality of pair-wise opposite salient poles 4 corresponding to the phases of the machine. The ferromagnetic structure of the stator comprises coils 5 supplied with electric current to induce a magnetic field orienting the rotor.

The electric current supply to the coils, generally a battery 20, whose output is filtered by a filter 30 delimited by a discontinuous closed line comprising a choke 350 and a capacitor 360, is controlled separately in each coil by virtue of a synchronous rectification device comprising an H-bridge 10 situated between the battery and the earth so as to create a rotating field driving the rotor at the same so-called synchronism speed.

The H-bridge 10 delimited by a discontinuous closed line comprises two parallel electrical links 11 and 12 forming the vertical branches of an H, each link 11, 12 comprising two electronic switches 21, 31 and 22, 32, separated by a midpoint 13 or 14, the midpoints 13 and 14 of these links being connected together by the coil 5 of a phase of the machine.

In a contemporary embodiment of the H-bridge, generally adopted by reason of its simplicity, the switches may be transistors 23, 34, and diodes 33, 24, as in the example of FIG. 1, the diodes and the transistors being situated on a diagonal.

The transistors 23 and 34 are instructed by an electronic circuit 40 to allow the passage of the current through the coil 5 while the diodes 33 and 24 act as spontaneous switches making it possible to absorb the energy accumulated in the said coil. This manner of operation is termed asynchronous.

However the diodes, which exhibit significant leakage currents, bring about a not inconsiderable energy loss, even when stopped, and the overall efficiency of the machine may find itself limited to 85%.

Moreover, the switches are previously determined so as to always be instructed or always be "spontaneous", and the energy losses in the H-bridge turn out to be unbalanced, which hinders the reliability of the machine.

An alterno-starter consists for example of a variable-reluctance synchronous machine comprising an H-bridge and able to work in generator and motor modes, depending on the synchronous and asynchronous instructions which are imposed successively on the switches 21, 22, 31, 32.

Instructed as a generator, it transforms part of the mechanical energy available on the motor shaft into electrical energy to supply the electrical installation of the vehicle and recharge the battery through the diodes, hence in asynchronous mode.

Instructed as a motor, it transforms the electrical energy available on the battery, into mechanical energy either to start the engine of the vehicle, in which case it carries out the starter function, or to help it when cold, or to execute the so-called "stop and go" function of frequent stops and restarts, especially in town.

In the latter case, it is above all the transistors, instructed in synchronous mode, which transmit the energy from the battery to the coils of the stator, occasionally, and over short durations.

This synchronous machine has to be very reliable.

SUMMARY

To improve the overall energy efficiency and the reliability of the above machine, it is possible to seek to refine the H-bridges by dissociating the circuits which provide the power in motor mode from those which provide it in generator mode. Specifically, since they do not operate simultaneously, it is possible to separate them and to refine them in their essential functions in a specific manner. However this solution would be expensive.

The applicant has chosen a different more economical route and proposes a machine of the above type capable of catering for operation in motor mode and operation in generator mode by the same H-bridges while avoiding therein the energy losses due to the leakage currents of the diodes and improving the overall reliability thereof.

Accordingly, the invention relates firstly to a synchronous rectification device (10) of the H-bridge type supplying a coil (5) of a phase of a synchronous machine, comprising four switches (21, 31, 22, 32) disposed on the electrical links (11, 12) of this H-bridge and intended to be instructed by an electronic circuit (40), characterized in that each switch comprises at least one transistor (T1) instructed as a diode or otherwise by the electronic circuit (40) depending on whether or not the intensity I of the current crossing the coil exceeds a predetermined threshold S.

By dispensing with the diodes, one avoids the loss of energy due to their leakage current, thereby contributing to a first improvement of the overall efficiency of the synchronous machine.

Preferably, each switch consists of a certain number of transistors in parallel, the said number being determined by the power to be drawn in the switch.

The optimisation of the number of transistors as a function of the power further improves the overall efficiency of the machine. In addition to an improvement in its reliability, by virtue of the redundancy of the transistors that is thus obtained by placing them in parallel, one even improves its security of operation.

In particular, the numbers of operational transistors in the switches may be chosen by the electronic circuit itself to improve the efficiency of the synchronous machine in the motor or generator modes of its operation.

Advantageously, the transistors are all identical, this being less expensive in respect of the industrial manufacture of the machine.

Advantageously again, the transistors are MOSs.

The invention also relates to a polyphase synchronous electric machine with per phase a coil supplied, by a DC supply, under the control of a synchronous rectification device of the above type comprising four switches instructed by an electronic circuit, machine characterized in that the electronic circuit is designed to instruct the four switches in distinct pairs, each pair consisting of two of the four switches, always chosen in series with the coil, all the pairs being alternately instructed either to supply the coil with forward or reverse current, or else to restore the energy accumulated therein.

By using a synchronous rectification device of the type seen above, the efficiency of the machine is improved to 95%.

By alternately reversing the roles of the pairs of switches, the functions of the said switches are made general-purpose and there is a balancing of the losses over time, thereby improving the reliability of the H-bridge, hence of the synchronous machine.

Preferably, a sensor of current being provided on the circuit of the coil, the electronic circuit is designed to instruct a pair of switches in synchronous mode if the current in the coil is greater in absolute value than a predetermined threshold, otherwise in asynchronous mode, the transistors concerned then intervening only through their internal diode, the other two switches being instructed to close.

Advantageously, the electronic circuit for instructing the switches is designed to offset the instructions for the said switches in time upon the change of mode to avoid the short-circuiting of the DC supply.

Again preferably, the synchronous machine comprises on its rotor a sensor of position of the rotor linked to the electronic circuit, and the electronic circuit is designed to instruct the polyphase synchronous machine as a function of the position of the rotor according to a motor mode or a generator mode, in accordance with a usage cue delivered by the engine processor of a motor vehicle.

The invention will be better understood with the aid of the following description of a preferred embodiment of the synchronous rectification device and of the synchronous electric machine equipped with the synchronous rectification device according to the invention, with reference to the appended drawing, in which:

DETAILED DESCRIPTION

Figure 1:
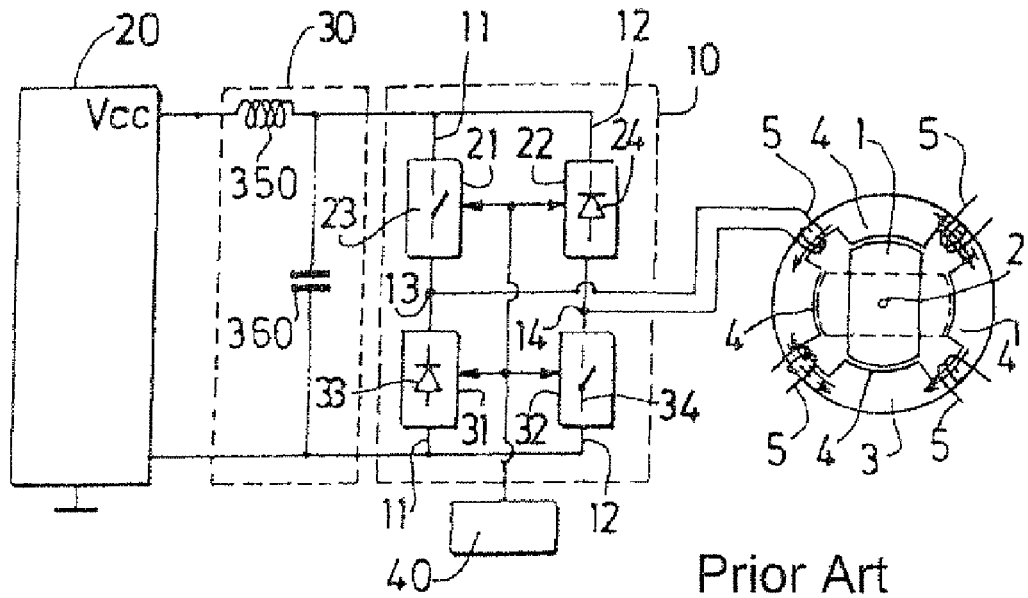
FIG. 1 represents a functional block diagram of an ordinary synchronous electric machine.
Figure 2:
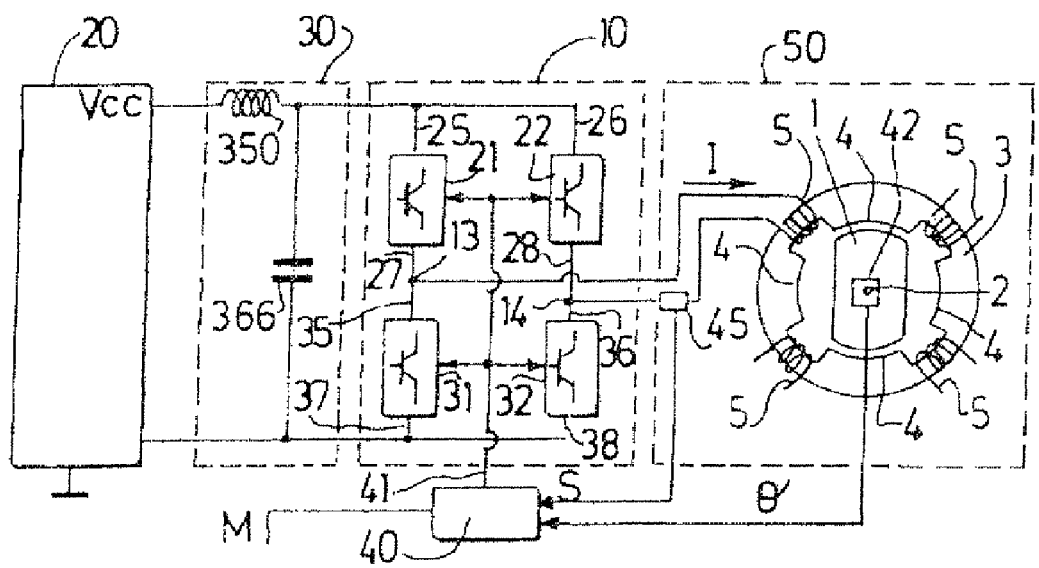
FIG. 2 is the same diagram for a synchronous electric machine equipped with its synchronous rectification device in accordance with the invention.

With reference to FIG. 2, the polyphase synchronous electric machine comprises all the elements of the machine of FIG. 1 seen above: a battery 20, a filter 30, a synchronous rectification device, here an H-bridge 10, an electronic circuit 40, here a programmable logic circuit, a motor 50 delimited by a discontinuous closed line with a rotor 1 rotating about a spindle 2 and a stator 3 comprising poles 4 and coils 5 whose terminals connect the midpoints 13 and 14 of the corresponding H-bridges 10, only one of which is represented in FIGS. 1 and 2.

In addition, the machine comprises on each coil 5 a current sensor 45 delivering a cue regarding the current I flowing around the coil, indicating the value and the direction of the current, and also whether the current I is, in absolute value, smaller or larger than a predetermined threshold S.

Finally, the programmable logic circuit 40 receives a cue θ, delivered by an angular sensor, 42, regarding the angular position of the rotor 1 on its spindle 2 and cues M originating from the engine processor of the vehicle (not represented).

On the basis of these cues, the programmable logic circuit 40 instructs the H-bridge 10 via electrical links 41 acting on the four switches 21, 22, 31, 32.

Figure 3:
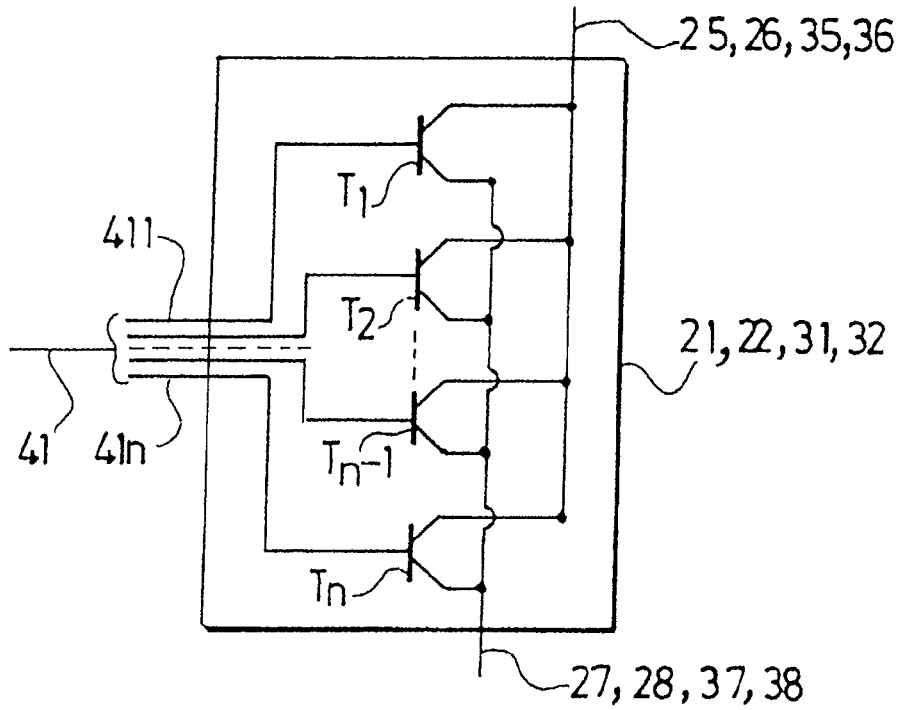
FIG. 3 is an electrical diagram of an electronic switch entering into the construction of the synchronous rectification device according to the invention.

The four switches are all structurally identical. A switch 21, 22, 31, 32, comprises, with reference to FIG. 3, n identical transistors T1, . . . , Tn placed in parallel between their input 27, 28, 37, 38 and their output 25, 26, 35, 36. It is for example possible to choose n from 3 to 5, or more, it being possible for the transistors of a switch to be instructed simultaneously through a single instruction 41 or separately through instructions 411 to 41n, the number of transistors to be instructed being optimized according to the operating modes of the machine and the power to be transmitted.

MOSs may be chosen as transistors.

The instructions for the switches will now be explained.

Figure 4:
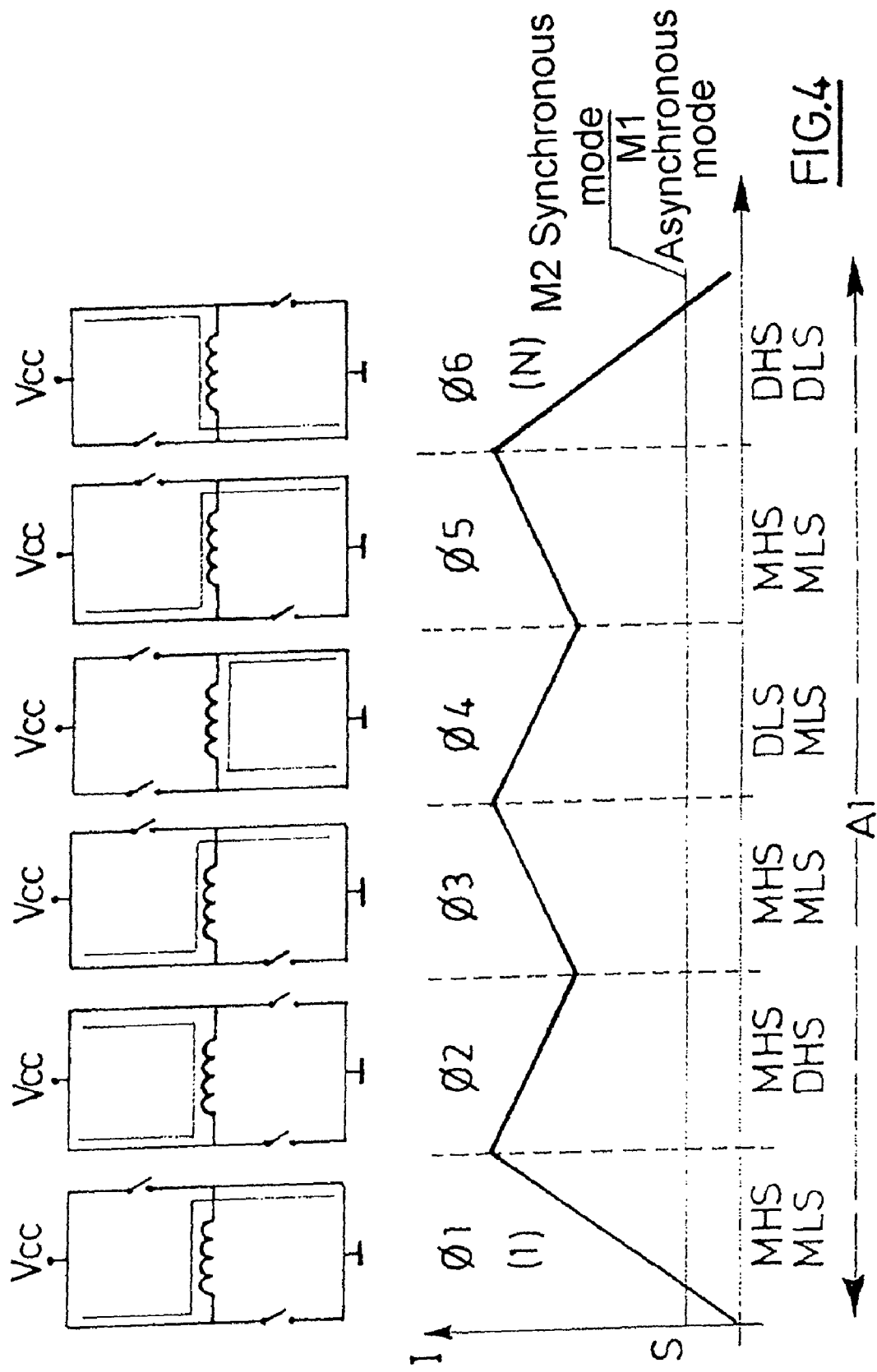
FIG. 4 is a timing diagram of the operation of the synchronous rectification device according to the invention.

With reference to FIGS. 2 and 4, during an alternation A1, the four switches 21, 31, 22, 32 of the H-bridge 10 being respectively designated by the customary labels MHS, DLS, DHS, MLS (as MOS High/Low Side and Diode High/Low Side, despite the absence of diodes and the general-purpose nature of the functions of the switches), are instructed according to N phases, here, in the example, N being equal to six successive phases φ1 to φ6:

φ1: MHS and MLS instructed to close, DHS and DLS instructed as a diode,

φ2: MHS and DHS instructed to close, MLS and DLS instructed as a diode,

φ3: MHS and MLS instructed to close, DHS and DLS instructed as a diode,

φ4: DLS and MLS instructed to close, MHS and DHS instructed as a diode,

φ5: MHS and MLS instructed to close, DHS and DLS instructed as a diode,

φ6: DHS and DLS instructed to close, MHS and MLS instructed as a diode.

The switches are said to be instructed as a diode if the transistors are instructed to simulate a diode behaviour, in the manner which will be explained later.

It may be seen that the four switches are instructed by the programmable logic circuit 40 in distinct pairs, each pair consisting of two switches in series with the coil 5.

The first and last phases of the alternation A1, here φ1 and φ6, are themselves split into two subphases M1 and M2 corresponding to two different modes of operation. If the current I in the coil 5 is greater in absolute value than the threshold S, then the switches are instructed as diodes as has just been seen, in synchronous mode.

Otherwise, the threshold S not being reached by the current I in the coil, the switches DHS and DLS are no longer instructed, the transistors concerned intervening naturally only via their internal diode, in asynchronous mode.

The overstepping of the threshold S by the current I cannot be effected without a device explained hereinafter lest the supply be short-circuited (a phenomenon known as "cross-conduction").

Figure 5:
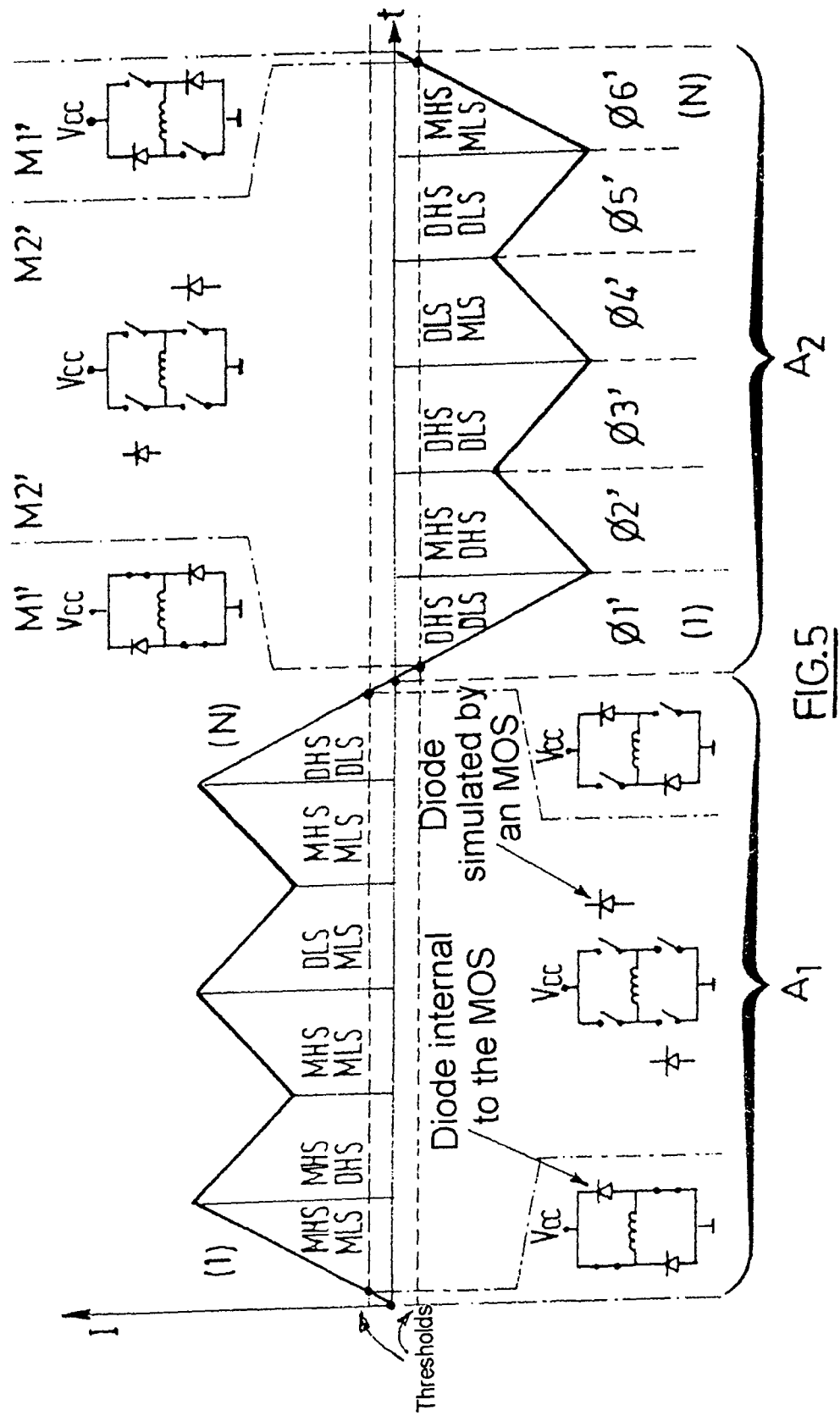
FIG. 5 is a timing diagram of the operation of the same device implemented in the synchronous electric machine according to the invention.

With reference to FIG. 5, during the next alternation A2, the four switches 21, 31, 22, 32 are instructed according to the N phases, here six phases φ1' to φ6', symmetric with the previous ones, successively:

φ1': DHS and DLS instructed to close, MHS and MLS instructed as a diode,
φ2': DHS and MHS instructed to close, DLS and MLS instructed as a diode,
φ3': DLS and DHS instructed to close, MLS and MHS instructed as a diode,
φ4': DLS and MLS instructed to close, MHS and DHS instructed as a diode,
φ5': DHS and DLS instructed to close, MHS and MLS instructed as a diode,
φ6': MHS and MLS instructed to close, DHS and DLS instructed as a diode.

In the same way as above, the first and last phases φ1' and φ6' of the alternation are split into two subphases M1' and M2' corresponding to the two modes of operation, synchronous and asynchronous, of the H-bridge.

The four switches 21, 22, 31, 32 are therefore instructed by the programmable logic circuit 40 in distinct pairs, each pair consisting of two of the four switches, still chosen in series with the coil 5, and according to successive alternations A1, A2 in the course of which the programmable logic circuit 40 alternately instructs all the pairs either to supply the coil with forward or reverse current, or else to restore the energy accumulated therein.

The programmable logic circuit 40 instructs the transistors "as diodes" in the following manner: on the basis of the cue regarding the value of the current I delivered by the sensor 45, it instructs the disabling of the transistor only if this current is in a determined direction, the passing direction of the diode simulated, otherwise it instructs the transistor so as to close it, that is to say render it passing but at the same time establish a current I in the coil at a value which would be established in accordance with the characteristic of the diode simulated if it were to act by asynchronous rectification.

Figure 6:
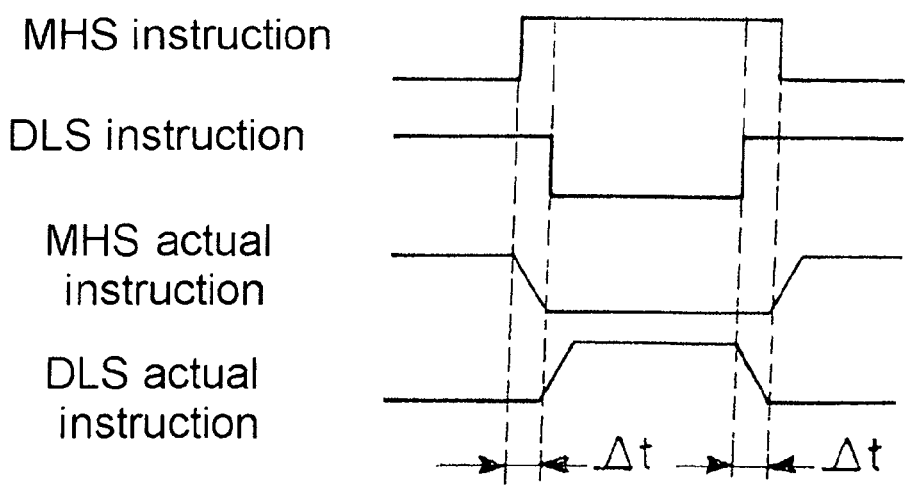
FIG. 6 is a timing diagram of the instructing of the switches so as to avoid the short-circuiting of the DC supply.

As two transistors of one and the same link cannot be rendered passing simultaneously without short-circuiting the supply 20, in particular upon the change of mode during the above phases φ1, φ6; φ1', φ6', the programmable logic circuit 40 is designed to avoid this short-circuit known as cross-conduction by instructing the switches MHS and DLS concerned in a manner offset in time by a duration Δt, as shown in FIG. 6.

The duration Δt chosen is at least equal to the time to establish the logic levels in the transistors of these switches.

The cue θ emanating from the sensor of angular position 42 of the rotor and the cue M coming from the engine processor allow the programmable logic circuit 40 to instruct the polyphase synchronous machine on the one hand in motor mode by optimizing the number N of phases φi necessary as a function of the speed of the rotor 1 and by determining the number n of transistors to be rendered operational in each switch of each H-bridge 5 to optimize the efficiency as a function of the power to be transmitted, or
on the other hand in generator mode, likewise determining therein the number n, as a function of the recharging of the DC supply 20 to optimize this recharging.

Thus the numbers n of operational transistors in the links are chosen by the programmable logic circuit 40 to improve the efficiency of the synchronous machine in the two modes of operation, motor and generator.

The invention claimed is:

1. A synchronous rectification device of the H-bridge type supplying a coil of a phase of a synchronous machine, comprising:
four switches disposed on electrical links of the H-bridge and instructable by an electronic circuit, wherein each of the four switches comprises at least one transistor selectively instructed as a diode and otherwise by the electronic circuit depending on whether or not the intensity of the current crossing the coil exceeds a predetermined threshold.

2. The device according to claim 1, wherein the at least one transistor in each of the four switches consists of a plurality of transistors in parallel, a number of transistors in the plurality of transistors being determined by the power to be dissipated within each of the four switches.

3. The device according to claim 2, wherein the number of transistors in the each of the four switches is chosen to be from 3 to 5.

4. The device according to claim 2, wherein the plurality of transistors are all identical.

5. The device according to claim 4, wherein the plurality of transistors are MOS transistors.

6. A polyphase synchronous electric machine with per phase a coil supplied, by a DC supply, under the control of a synchronous rectification device according to claim 1, comprising four switches instructed by an electronic circuit, designed to instruct the four switches in distinct pairs, each pair consisting of two of the four switches, always chosen in series with the coil, all the pairs being alternately instructed either to supply the coil with forward or reverse current, or else to restore the energy accumulated therein.

7. The polyphase synchronous electric machine according to claim 6, further comprising a sensor for measuring the current is provided on the circuit of the coil, the electronic circuit (40) is designed to instruct a pair of switches in synchronous mode if the current in the coil is greater in absolute value than a predetermined threshold, otherwise in asynchronous mode, the transistors concerned then intervening only through their internal diode, the other two switches being instructed to close.

8. Machine according to claim 7, wherein the electronic circuit for instructing the four switches is designed to offset the instructions for the four switches in time upon the change of mode to avoid short-circuiting of the DC supply.

9. Machine according to claim 6, comprising:
rotor;
a sensor of angular position of the rotor linked to the electronic circuit designed to instruct the polyphase synchronous machine as a function of the position of the rotor according to a motor mode or a generator mode, in accordance with a usage cue delivered by the engine processor of a motor vehicle.

10. The synchronous rectification device of claim 1, wherein the four switches are alternatively instructed by the electronic circuit in distinct pairs, each of the distinct pairs consisting of two of the four switches in series with the coil, wherein the electronic circuit instructs a first of the distinct pairs as diodes and a second of the distinct pairs to close, and wherein the electronic circuit instructs the first distinct pair as diodes by configuring the at least one transistor for one of simulating a diode behavior and using an internal diode.

* * * * *